United States Patent [19]
Van Dest

[11] Patent Number: 5,505,660
[45] Date of Patent: Apr. 9, 1996

[54] ARTICULATED TRANSMISSION JOINT OF THE SLIDING TYPE

[75] Inventor: Jean-Claude Van Dest, Saintry sur Seine, France

[73] Assignee: GKN Automotive AG, Lohmar, Germany

[21] Appl. No.: 32,999

[22] Filed: Mar. 18, 1993

[30] Foreign Application Priority Data

Mar. 18, 1992 [FR] France ................................. 92 03250

[51] Int. Cl.⁶ .................................................. F16D 3/205
[52] U.S. Cl. ......................... 464/111; 464/167; 464/905
[58] Field of Search ............................... 464/111, 905, 464/167, 132, 122; 384/57

[56] References Cited

U.S. PATENT DOCUMENTS

| | | |
|---|---|---|
| 2,555,921 | 6/1951 | Davis . |
| 4,512,750 | 4/1985 | Orain ................................. 464/111 |
| 4,571,214 | 2/1986 | Orain ................................. 464/905 |
| 4,689,035 | 8/1987 | Orain ................................. 464/905 |
| 4,775,335 | 10/1988 | Mizukoshi ......................... 464/111 |
| 4,840,600 | 6/1989 | White . |
| 5,184,977 | 2/1993 | Girguis ............................... 464/111 |
| 5,203,741 | 4/1993 | Turner et al. ...................... 464/111 |

FOREIGN PATENT DOCUMENTS

| | | |
|---|---|---|
| 0206886 | 12/1986 | European Pat. Off. . |
| 561665 | 9/1993 | European Pat. Off. ............ 464/111 |
| 2056872 | 12/1982 | France . |
| 2605071 | 10/1986 | France . |
| 2663699 | 12/1991 | France . |
| 861008 | 2/1961 | United Kingdom . |
| 2099551 | 12/1982 | United Kingdom . |

OTHER PUBLICATIONS

Japanese abstract 59,069,527; Apr. 19, 1984.

*Primary Examiner*—Daniel P. Stodola
*Assistant Examiner*—Eileen A. Dunn
*Attorney, Agent, or Firm*—Harness, Dickey & Pierce

[57] ABSTRACT

A transmission joint of the sliding type has a joint body (12) and a tripode (14) having three arms (16) each of which is capable of sliding between two parallel and plane surface portions (36) by means of an articulation element (18) which is carried by the arm (16) of the tripode (14) and which comprises two parallel and opposite plane faces (20) each of which interacts with one of the plane surface portions (36) with interposition of a row of bearing needles (32), wherein the joint body (12) comprises three bearing races each comprising two tracks (38) each of which consists of a component comprising a plane surface portion (36) and a convex cylindrical surface portion (40) which interacts with a complementary concave cylindrical bearing surface (42) formed in the joint body (12) with respect to which it is capable of pivoting, and in that each arm (16) of the tripode comprises a journal on which the intermediate articulation element (18) is mounted to revolve about an axis (Y-Y) parallel to its opposite plane surfaces (20).

7 Claims, 1 Drawing Sheet

5,505,660

ARTICULATED TRANSMISSION JOINT OF THE SLIDING TYPE

FIELD OF THE INVENTION

The present invention relates to an articulated transmission joint of the sliding type, especially for a motor vehicle. More particularly, the present invention relates to a constant velocity transmission joint of the type comprising a transmission joint body, also called a barrel, and a tripod comprising three radial arms evenly distributed about the axis of rotation of the tripod and each of which comprises articulation elements of the transmission joint which interact with a bearing race associated with the transmission joint body.

BACKGROUND AND SUMMARY OF THE INVENTION

The document FR-A-2,506,872 describes a constant velocity joint of this type in which each radial arm of the tripod is capable of sliding between two portions of plane and parallel surfaces of the transmission joint body by means of an articulation element carried by the arm of the tripod and which comprises two opposite and parallel plane faces each of which interacts with one of the plane surface portions of the transmission joint body with the interposition of a row of bearing needles held in a cage.

Such a design of a telescopic transmission joint is particularly advantageous in so far as it makes it possible to filter out the vibrations coming from the drive member and in so far as the joint is practically free of periodic internal friction.

Various methods for implementing the design principle of such a joint have been proposed, such as, for example, those described and represented in the document FR-A-2,583,476.

It is nevertheless noted that the transmission joint body is difficult to produce economically in so far as it is necessary to form, in the transmission joint body, parallel and plane pairs of raceways for the bearing needles as well as faces or grooves for guiding and holding the cages of needles. It is also necessary to produce spherical tripod arms.

The object of the present invention is to propose a transmission joint implementing the design principle mentioned previously, in which the transmission joint body is particularly simple to produce.

Another object of the present invention is to allow standardisation in the manufacture of transmission joint bodies of the constant velocity type so that one and the same joint body comprising bearing races in the form of axial grooves of circular-profiled cross-section may be used with a tripod whose articulation elements comprise cages of bearing needles as has been explained previously, or with a tripod whose articulation elements are spherical rollers mounted to swivel on the arms of the tripod.

To this end, the present invention proposes an articulated transmission joint of the sliding type comprising a transmission joint body and a tripod comprising three radial arms evenly distributed about the axis of rotation of the tripod and each of which is capable of sliding between two parallel and plane surface portions of the joint body by means of an articulation element which is carried by the arm of the tripod and which comprises two parallel and opposite plane faces each of which interacts with one of the plane surface portions with interposition of a row of bearing needles held in a cage, characterised in that the joint body comprises three bearing races each comprising two tracks each of which consists of a component comprising a plane surface portion which interacts with the bearing needles of one of the rows of needles and comprising a plane surface portion which interacts with the bearing needles of one of the rows of needles and comprising a convex cylindrical surface portion whose axis is parallel to the plane surface portion and which interacts with a complementary concave cylindrical bearing surface formed in the joint body with respect to which it is capable of pivoting, and in that each arm of the tripod comprises a journal on which the intermediate articulation element is mounted to revolve about an axis parallel to its opposite plane surfaces.

According to other characteristics of the invention:

- each intermediate articulation element is axially immobilized with respect to the associated journal;
- each track is axially immobilised with respect to the joint body;
- each intermediate articulation element is a cylinder section whose end faces are perpendicular to the axis of the cylinder and which is pierced through its middle with a hole whose axis is concurrent with and perpendicular to the axis of the cylinder and which receives the journal;
- each of the cages of needles comprises at least one longitudinal guidance and holding flank which extends in a direction perpendicular to the axes of rotation of the needles and which interacts with at least one complementary guidance surface of the associated track; or
- each cage comprises two parallel guidance and holding flanks between which there are received two parallel and opposite flanks of the associated track.

BRIEF DESCRIPTION OF THE DRAWINGS

Other characteristics and advantages of the invention will emerge upon reading the description which follows, for the understanding of which reference will be made to the appended drawing in which.

DETAILED DESCRIPTION OF THE PREFERRED EMBODIMENT

Figure 1:
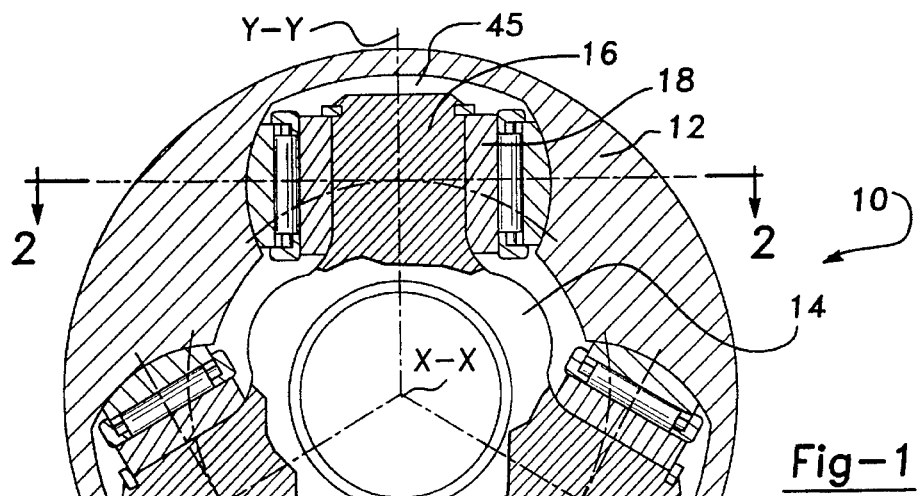
FIG. 1 is a transverse sectional view through a plane containing the axes of the arms of the tripod of a sliding constant velocity transmission joint produced in accordance with the teachings of the present invention.
Figure 3:
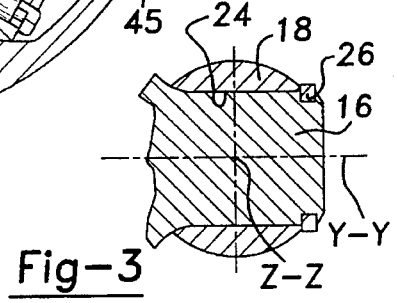
FIG. 3 is a sectional view along the line 3—3 in FIG. 2.

The transmission joint 10 illustrated in FIG. 1 comprises a transmission joint body 12, also called a barrel which may, for example, be connected to a drive member of a motor vehicle transmission.

The transmission joint 10 also comprises a tripod 14 comprising three radial arms 16 evenly distributed at 120° about its axis of rotation X-X.

The tripod 14 may, for example, be connected to a driven member of the transmission of the vehicle.

Each of the arms 16 is produced in the form of a cylindrical journal whose axis Y-Y is concurrent with and perpendicular to the axis of rotation X-X of the tripod 14.

Each journal 16 rotationally receives an intermediate articulation element 18.

In the embodiment illustrated in the figures, the intermediate element 18 is a section of a cylinder of axis Z-Z.

The section is axially delimited by two opposite plane end faces 20 which are perpendicular to the axis Z-Z.

The cylinder 18 is pierced through its middle by a hole 24 whose axis is perpendicular to and concurrent with the axis Z-Z and whose diameter substantially corresponds to the outside diameter of the cylinder journal 16 so that the articulation element 18 is mounted to revolve on the journal 16 about the axis Y-Y.

The articulation element 18 is axially immobilised on the journal 16 by means of an elastic ring 26 which is mounted in a radial groove 28 formed in the vicinity of the free end face 30 of the journal 16.

Each of the two plane faces 20 interacts with a row of needles 32.

Each row of bearing needles 32 is held in a cage 34.

The bearing needles 32 of each row also interact with a plane surface portion 36 formed on a track 38.

Each track 38 is produced in the form of a component or bar and it also comprises a convex cylindrical surface portion 40 whose axis is parallel to the plane of the plane surface portion 36.

Each cage of needles 34 comprises two opposite and parallel longitudinal flanks 43 and 44 which respectively interact with the opposite and parallel flanks 46 and 48 of the track 38 associated with the cage 34.

The flanks 46 and 48 are perpendicular to the plane of the plane surface portion 36 and each cage of needles 34 is thus held in the radial direction with respect to the track 38 and guided longitudinally in a direction parallel to the plane of the plane surface 36 and to the axis of the convex cylindrical surface portion 40.

The convex cylindrical surface portion 40 of each track or bar 38 interacts with a complementary concave cylindrical surface portion 42 formed in the transmission joint body 12.

The transmission joint body 12 comprises, for this purpose, three axial grooves 45 whose profile, in cross section, is partially circular so as to constitute, for each groove 45, the two facing concave cylindrical surface portions 42.

The transmission joint body 12 thus has a known shape which also allows the mounting of a sliding constant velocity joint tripod (not shown) each journal of which is equipped with a bearing roller of spherical profile whose outer surface interacts directly with the concave cylindrical surface portions 42.

The design of the joint body 12 is therefore particularly simple and its manufacture, for example by forging and sizing may be produced industrially in a very economical manner.

Figure 2:
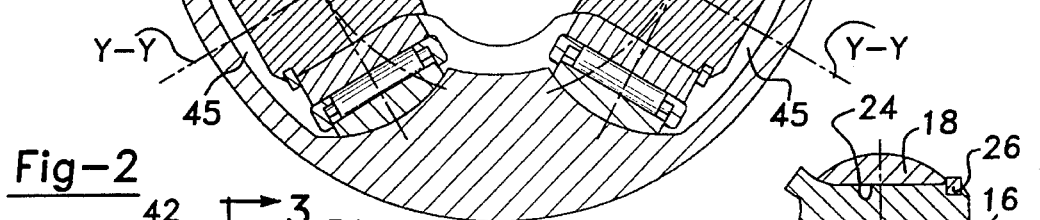
FIG. 2 is a sectional view along the line 2—2 of FIG. 1.
Figure 2A:
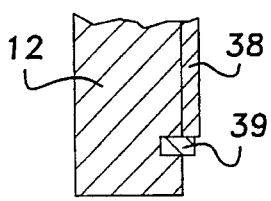
FIG. 2A is a partial view similar to FIG. 2 illustrating an alternative embodiment.
Figure 4:
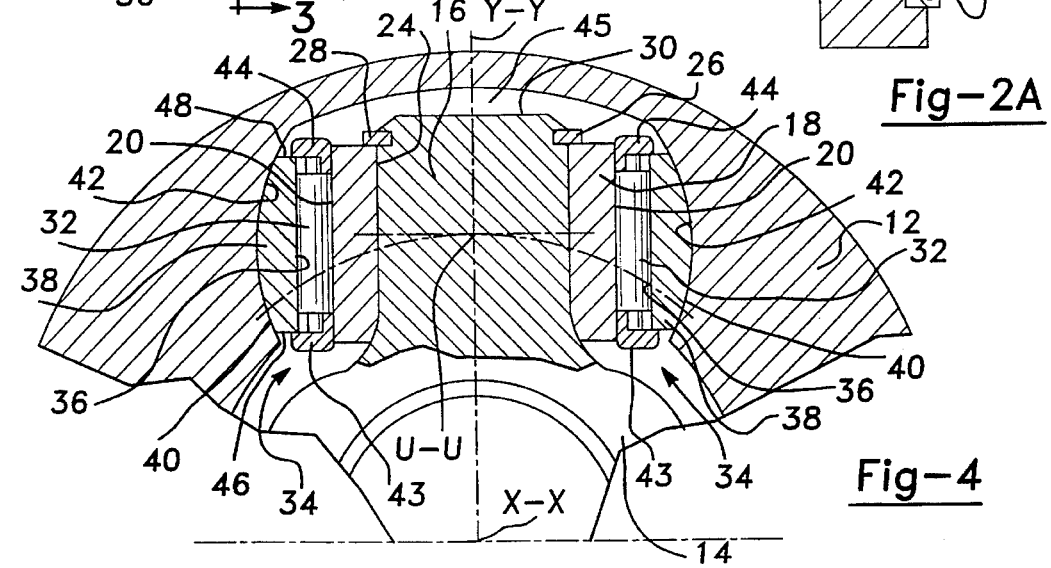
FIG. 4 is a view on a larger scale of a detail of FIG. 1.

According to a characteristic which is illustrated in FIG. 2A, the tracks or bars 38 are axially immobilized with respect to the transmission joint body 12 by any suitable means such as annular member 39 disposed in grooves in the body 12, and they can only move with respect to the latter by pivoting about an axis which corresponds substantially to the axis U-U common to the concave cylindrical surface portions 42.

The invention is not limited to the embodiment mode which has just been described.

It is, for example, possible to produce the two tracks or bars 38 in the form of a single element by connecting the two bars 38 together by a transverse portion so as to constitute a U-shaped component.

The cages of needles 34 may be guided and held by any means equivalent to the flanks 43 and 44 and, for example, by means of a single flank which would be received in a longitudinal holding and guidance groove formed in the plane surface portion 36 of the bar 38 associated with the cage of needles.

The shape of the intermediate element 18 is not limited to a cylinder section.

As for the cage of needles 34, the two needle cages may be produced in the form of a single element.

The transmission joint body may also be produced from a synthetic composite material in accordance with the teachings of document FR-A-2,663,699.

What is claimed is:

1. An articulated transmission joint of the sliding type comprising:

a transmission joint body, said joint body comprising three bearing races each having two tracks, each of said tracks having a plane surface portion and a convex cylindrical surface portion whose axis is parallel to said plane surface portion and which convex surface portion interacts with a complementary concave cylindrical bearing surface formed in the joint body, said convex cylindrical surface portion being capable of pivoting with respect to said concave cylindrical bearing surface;

a tripod comprising three radial arms evenly distributed about the axis of rotation of the tripod, each of said radial arms being capable of sliding between two parallel said plane surface portions of the joint body;

an articulation element journaled on each radial arm of the tripod, each articulation element having two parallel and opposite plane faces each of which interacts with one of the said plane surface portions, said articulation element rotatable about an axis parallel to said opposite plane faces; and a row of bearing needles held in a cage interposed each of said plane surface portions and said articulation elements such that said plane surface portion interacts with the bearing needles of one of the rows of needles.

2. The transmission joint according to claim 1 wherein each intermediate articulation element is axially immobilised with respect to the associated radial arm.

3. The transmission joint according to claim 2 wherein each track is axially immobilised with respect to the joint body.

4. The transmission joint according to claim 1 wherein each intermediate articulation element is a cylinder section whose end faces are perpendicular to the axis of the cylinder and which is pierced through its middle with a hole whose axis is concurrent with and perpendicular to the axis of the cylinder and which receives the radial arm.

5. The transmission joint according to claim 1 wherein each of the cages comprises at least one longitudinal guidance and holding flange which extends in a direction perpendicular to the axes of rotation of the needles and which interacts with at least one complementary guidance surface of the associated track.

6. The transmission joint according to claim 5 wherein each cage comprises two parallel guidance and holding flanks between which there are received two parallel and opposite flanks of the associated track.

7. The transmission joint according to claim 1 wherein each track is axially immobilised with respect to the joint body.

* * * * *